United States Patent [19]
Pyne et al.

[11] 3,778,247
[45] Dec. 11, 1973

[54] METHOD FOR REGULATING PLANT GROWTH
[75] Inventors: William J. Pyne; James M. Gullo, both of Painesville, Ohio; Bobby F. Adams, Pasadena, Tex.
[73] Assignee: Diamond Shamrock Corporation, Cleveland, Ohio
[22] Filed: Feb. 8, 1971
[21] Appl. No.: 113,658

Related U.S. Application Data
[60] Continuation-in-part of Ser. No. 43,215, June 3, 1970, abandoned, which is a continuation-in-part of Ser. No. 8,152, Jan. 19, 1970, abandoned, which is a division of Ser. No. 642,708, June 1, 1967, abandoned.

[52] U.S. Cl.................................. 71/95, 260/326.3
[51] Int. Cl................................................ A01n 9/22
[58] Field of Search......................................... 71/95

[56] References Cited
UNITED STATES PATENTS
3,639,608  2/1972  Adams et al............................ 71/95
2,829,146  4/1958  Beaver et al............................ 71/95
3,288,851  11/1966  Martin et al........................... 71/120
3,318,947  5/1967  Speziale et al......................... 71/120

OTHER PUBLICATIONS

Brown et al., Journal of American Chemical Society, 77, pp. 1079–1097 (1955) (cited by applicant).

Beaver et al., Journal of American Chemical Society, 79, pp. 1236–1245 (1957) (cited by applicant).

Chemical Abstracts, vol. 74, col. 99859Z 1971.

*Primary Examiner*—James O. Thomas, Jr.
*Attorney*—Roy Davis

[57] ABSTRACT

A process for regulating plant growth using pyrrolidinyl-carboxanilides and pyrrolidinyl-thiocarboxanilides has been found. Both substituted and unsubstituted pyrrolidinyl carboxanilides and pyrrolidinyl-thiocarboxanilides can be used in the process.

13 Claims, No Drawings

METHOD FOR REGULATING PLANT GROWTH

CROSS REFERENCE TO RELATED APPLICATIONS

This application is a continuation-in-part of copending application Ser. No. 43,215, Pyne, Gullo, and Adams, filed June 3, 1970, now abandoned, which in turn is a continuation-in-part of application Ser. No. 8,152, Adams, Pyne, and Gullo (Case II), filed Jan. 19, 1970, and now abandoned, which in turn is a divisional application of Ser. No. 642,708, Adams, Pyne, and Gullo, filed June 1, 1967, and now abandoned.

BACKGROUND OF THE INVENTION

1. Field of the Invention

This invention relates to a method for regulating plant growth and more particularly to a process of applying to the locus of the unwanted plant growth such as weeds, a phytotoxic amount of a pyrrolidinyl-carboxanilide or pyrrolidinyl-thiocarboxanilide.

2. Description of the Prior Art

It is known that certain substituted ureas are useful in controlling weeds. For example, 1-phenyl-3,3-dimethylureas which are substituted in the phenyl ring with halogen atoms are known to have good herbicidal action but are injurious to crops, hence have been restricted in use. Other ureas, for example, 1-phenyl-3-(2-methylcyclohexyl)-urea that are known to be safe on beneficial plants have found very restricted use because of their limited herbicidal action.

SUMMARY OF THE INVENTION

This invention is based on the unexpected discovery that pyrrolidinyl-carboxanilides and pyrrolidinyl-thiocarboxanilides of Formula (I):

(I) 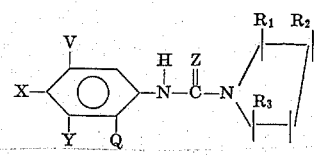

in which $R_1$, $R_2$, and $R_3$ are hydrogen or methyl or combinations of these provided at least one member is hydrogen, Z is oxygen or sulfur, Q is hydrogen, bromine, chlorine, fluorine, or iodine, and Y, X, and V are hydrogen, bromine, chlorine, fluorine, iodine, lower alkyl, alkoxy, halomethyl, cyano, or nitro with the proviso that Q is not fluorine when X, Y, and V are hydrogen and with the proviso that Q and V are not fluorine when X and Y are hydrogen, not only exhibit excellent herbicidal action but when applied at suitable rates also are very useful as selective herbicides to control the growth of undesirable plants and weeds in areas where important crops such as corn, rice, sorghum, cotton, peanuts, sugar beets, potatoes, beans such as field, dry and snap beans, small grains, sugar cane, bananas, coffee, pineapples, vegetables, fruit (including deciduous fruit), nut, citrus and other trees are being grown. Unless otherwise indicated, all other substituents in the formula are hydrogen.

It is an object of this invention to provide a process for regulating plant growth using pyrrolidinyl-carboxanilides and pyrrolidinyl-thiocarboxanilides. Another object is to provide a process for regulating unwanted plant growth using a selective herbicide. A further object is to provide a composition containing a selective herbicide and a process for its use. Other objects will become apparent from the detailed description given hereinafter. It is intended that this description and specific examples merely indicate preferred embodiments thereof and are not given to limit this invention since various changes and modifications within the scope of this invention will become apparent to those skilled in the art.

DESCRIPTION OF THE PREFERRED EMBODIMENTS

Accordingly, the present invention provides compounds of the above formula and also herbicidal compositions which can be admixtures of such a compound with a solid or liquid diluent or solutions of such a compound in liquid or solid solvents. These compounds can be used in undiluted form or can be formulated using the procedures and adjuvants described in U. S. Pat. No. 3,419,626, Pyne and Bluestone, issued December 31, 1968, in Col. 2, line 57, through Col. 4, line 2. The formulations may also contain suitable surfactants (surface active agents), other pesticides or growth regulants, fertilizer, spray oil, adhesives, other adjurants. These herbicidal compositions can contain from about 0.01 percent to about 99 percent by weight of the pyrrolidinyl-carboxanilide or pyrrolidinyl-thiocarboxanilide as the active ingredient.

Plant growth is regulated by applying a phytotoxic amount of the above pyrrolidinyl-carboxanilides or pyrrolidinylthiocarboxanilides to the locus of the plant growth. These compounds or their formulations are applied directly to the foliage when used as postemergence herbicides and are applied to soil when used as preemergence herbicides. The compounds can be applied in the form of sprays, drenches, dusts, emulsions, dispersions, suspensions, solutions, or in any other suitable form. The compounds are effective as herbicides when applied to plant growth or soil at rates of from about one-sixteenth to about 16 lb/A (pounds per acre) and particularly at rates from about one-fourth to about 4 lb/A.

Compounds of the above general formula can be prepared by known synthetic methods including those used commercially for the preparation of other ureas. A few methods are described below by way of illustration but are not intended to be an exhaustive list of suitable methods:

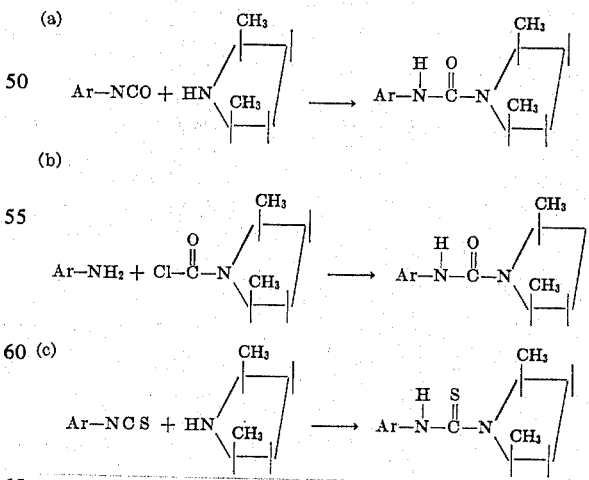

where Ar is substituted or unsubstituted phenyl such as phenyl, 4-bromophenyl, 2-chlorophenyl, 3-chlorophenyl, 4-chlorophenyl, 3-fluorophenyl, 4- fluorophenyl, 4-iodophenyl, 3-methylphenyl, 4-cyanophenyl, 3-methoxyphenyl, 4-methoxyphenyl, 3-nitrophenyl, 4-nitrophenyl, 3,4-dichlorophenyl, 2,4-difluorophenyl, 3-trifluoromethylphenyl, 2-chloro-5-trifluoromethylphenyl, 2,3,4,5-tetrafluorophenyl, and the like.

Pyrrolidines include pyrrolidine, cis-2,5-dimethylpyrrolidine, cis-2,4-dimethylpyrrolidine, and the like.

Reference may also be made to the examples for a fuller understanding of the invention. The examples are given merely to illustrate the invention and are not to be construed in a limiting sense. All percentages, quantities, parts, and proportions are by weight and all temperatures are °C unless otherwise indicated.

EXAMPLE 1

Preparation of
1-(cis-2,5-dimethylpyrrolidinyl)-carboxanilide
(Compound No. 5328) by Procedure (a)

Phenyl isocyanate (11 g, 0.092 m) is reacted in 100 ml of anhydrous benzene with cis-2,5-dimethylpyrrolidine (9.1 g, 0.092 m) prepared from 2,5-dimethylpyrrole by procedure of C. G. Overberger et al, JACS, 77, 4102 (1955). This mixture is heated to reflux for 3 hours, cooled, filtered, and solvent removed at reduced pressure. The residual solid is crystallized from a benzene-petroleum ether mixture to give 13 g (64 percent yield) of Compound No. 5328, a solid melting at 109°–110° C. Compound No. 5328 ($C_{13}H_{18}N_2O$) - Calculated: N, 12.8 percent; Found: N, 13.2 percent.

100 ml of anhydrous benzene with phenylisothiocyanate (13.5 g, 0.1 m). After the slight exothermic reaction subsides, the reaction mixture is heated to reflux for 3 hours, cooled, and solvent removed at reduced pressure. The residual solid is crystallized from a pentane-benzene mixture to give 14 g (60 percent yield) of Compound No. 5351, a solid melting at 104°–105° C. Compound No. 5351 ($C_{13}H_{18}N_2S$) - Calculated: N, 11.9; Found: N, 12.1 percent.

EXAMPLE 3

The procedures given in Examples 1 and 2 for the preparation of Compound No. 5328 and Compound No. 5351, respectively, are used to prepare these compounds as well as the other compounds shown in Table 1 below. This table gives the compound type, compound number, chemical name, empirical formula, percent yield, melting point (°C), N percent calculated and N percent found for these compounds. The compound Type I products are prepared by reacting the appropriate phenylisocyanate or phenylisothiocyanate with pyrrolidine whereas the compound Type II products are obtained by reaction of the appropriate isocyanates with cis-2,5-dimethylpyrrolidine and the compound Type III products are obtained by reaction of the appropriate isocyanates with cis-2,4-dimethylpyrrolidine. Cis-2,4-dimethylpyrrolidine is obtained by reduction of 2,4-dimethylpyrrole using the procedure described by C. G. Overberger et al in JACS, 77, 4102 (1958) for the cis-2,5-dimethylpyrrolidine; 2,4-dimethylpyrrole is prepared by the procedure given in Organic Synthesis, Collective Vol. II, page 217.

TABLE 1

| Compound type | Compound number | Chemical name | Empirical formula | Percent yield | Melting point, °C | N (percent) Calcd. | N (percent) Found |
|---|---|---|---|---|---|---|---|
| I | 3961 | 1-pyrrolidinylcarboxanilide | $C_{11}H_{14}N_2O$ | 91 | 130–131 | | |
| I | 4390 | 1-pyrrolidinylthiocarboxanilide | $C_{11}H_{14}N_2S$ | 93 | 149–150 | | |
| I | 4391 | 1-pyrrolidinyl-3'-chlorocarboxanilide | $C_{11}H_{13}ClN_2O$ | 91 | 143–144 | | |
| I | 4392 | 1-pyrrolidinyl-3',4'-dichlorocarboxanilide | $C_{11}H_{12}Cl_2N_2O$ | 78 | 179–180 | | |
| I | 4874 | 1-pyrrolidinyl-4'-chlorocarboxanilide | $C_{11}H_{13}ClN_2O$ | 100 | 167–168 | 12.5 | 12.3 |
| I | 4888 | 1-pyrrolidinyl-3'-trifluoromethylcarboxanilide | $C_{12}H_{13}F_3N_2O$ | 67 | 160–161 | 10.8 | 10.8 |
| I | 17025 | 1-pyrrolidinyl-2'-chloro-5'-trifluoromethylcarvoxanilide | $C_{12}H_{12}ClF_3N_2O$ | 68 | 104–105 | 9.7 | 10.0 |
| II | 5166 | 1-(cis-2,5-dimethylpyrrolidinyl)-3'-methylcarboxanilide | $C_{14}H_{20}N_2O$ | 76 | 73–75 | 12.1 | 12.7 |
| II | 5168 | 1-(cis-2,5-dimethylpyrrolidinyl)-4'-chlorocarboxanilide | $C_{13}H_{17}ClN_2O$ | 84 | 148–149 | 11.1 | 10.9 |
| II | 5171 | 1-(cis-2,5-dimethylpyrrolidinyl)-3'-chlorocarboxanilide | $C_{13}H_{17}ClN_2O$ | 81 | 118–119 | 11.1 | 11.4 |
| II | 5177 | 1-(cis-2,5-dimethylpyrrolidinyl)-4'-methoxycarboxanilide | $C_{14}H_{20}N_2O_2$ | 80 | 110–112 | 11.3 | 12.1 |
| II | 5307 | 1-(cis-2,5-dimethylpyrrolidinyl)-3',4'-dichlorocarboxanilide | $C_{13}H_{16}Cl_2N_2O$ | 78 | 137–138 | 9.7 | 9.7 |
| II | 5327 | 1-(cis-2,5-dimethylpyrrolidinyl)-3'-methoxycarboxanilide | $C_{14}H_{20}N_2O_2$ | 61 | 104–106 | 11.3 | 11.3 |
| II | 5328 | 1-(cis-2,5-dimethylpyrrolidinyl)-carboxanilide | $C_{13}H_{18}N_2O$ | 65 | 109–110 | 12.8 | 13.2 |
| II | 5351 | 1-(cis-2,5-dimethylpyrrolidinyl)-thiocarboxanilide | $C_{13}H_{18}N_2S$ | 60 | 104–105 | 12.0 | 12.1 |
| II | 5372 | 1-(cis-2,5-dimethylpyrrolidinyl)-4'-cyanocarboxanilide | $C_{14}H_{17}N_3O$ | 41 | 160–161 | 17.3 | 17.1 |
| II | 5374 | 1-(cis-2,5-dimethylpyrrolidinyl)-4'-fluorocarboxanilide | $C_{13}H_{17}FN_2O$ | 75 | 135 | 11.9 | 11.5 |
| II | 5379 | 1-(cis-2,5-dimethylpyrrolidinyl)-3'-trifluoromethylcarboxanilide | $C_{14}H_{17}F_3N_2O$ | 85 | 129–130 | 9.8 | 10.0 |
| II | 5391 | 1-(cis-2,5-dimethylpyrrolidinyl)-3'trifluoromethylthiocarboxanilide | $C_{14}H_{17}F_3N_2S$ | 80 | 120–121 | 9.3 | 9.5 |
| II | 5403 | 1-(cis-2,5-dimethylpyrrolidinyl)-4'-nitrocarboxanilide | $C_{13}H_{17}N_3O_3$ | 98 | 114–116 | 16.0 | 16.3 |
| II | 5456 | 1-(cis-2,5-dimethylpyrrolidinyl)-4'-bromocarboxanilide | $C_{13}H_{17}BrN_2O$ | 88 | 131–132 | 9.4 | 9.2 |
| II | 5457 | 1-(cis-2,5-dimethylpyrrolidinyl)-2'-chlorocarboxanilide | $C_{13}H_{17}ClN_2O$ | 93 | Oil | 11.1 | 10.4 |
| II | 5460 | 1-(cis-2,5-dimethylpyrrolidinyl)-3'-nitrocarboxanilide | $C_{13}H_{17}N_3O_3$ | 84 | 130–131 | 16.0 | 16.1 |
| II | 16654 | 1-(cis-2,5-dimethylpyrrolidinyl)-3'-fluorocarboxanilide | $C_{13}H_{17}FN_2O$ | 64 | 117–118 | 11.7 | 11.8 |
| II | 16947 | 1-(cis-2,5-dimethylpyrrolidinyl)-4'-iodocarboxanilide | $C_{13}H_{17}IN_2O$ | 87 | 134–135 | 8.1 | 7.7 |
| II | 17256 | 1-(cis-2,5-dimethylpyrrolidinyl)-2'-4'-difluorocarboxanilide | $C_{13}H_{16}F_2N_2O$ | 54 | 78–80 | | |
| II | 17836 | 1-(cis-2,5-dimethylpyrrolidinyl)-2',3',4',5'-tetrafluorocarboxanilide | $C_{13}H_{14}F_4N_2O$ | 58 | 102–106 | 9.7 | 9.6 |
| III | 5498 | 1-(cis-2,4-dimethylpyrrolidinyl)-3'-chlorocarboxanilide | $C_{13}H_{17}ClN_2O$ | 93 | Oil | 11.1 | 11.0 |
| III | 5509 | 1-(cis-2,4-dimethylpyrrolidinyl)-4'-chlorocarboxanilide | $C_{13}H_{17}ClN_2O$ | 95 | 139 | 11.1 | 11.4 |
| III | 5510 | 1-(cis-2,4-dimethylpyrrolidinyl)-4'-bromocarboxanilide | $C_{13}H_{17}BrN_2O$ | 89 | 155 | 9.4 | 9.3 |
| III | 5511 | 1-(cis-2,4-dimethylpyrrolidinyl)-carboxanilide | $C_{13}H_{18}N_2O$ | 85 | 113–114 | 12.8 | 13.0 |
| III | 5512 | 1-(cis-2,4-dimethylpyrrolidinyl)-4'-fluorocarboxanilide | $C_{13}H_{17}FN_2O$ | 57 | 95–96 | 11.9 | 11.7 |
| III | 5524 | 1-(cis-2,4-dimethylpyrrolidinyl)-3',4'-dichlorocarboxanilide | $C_{13}H_{16}Cl_2N_2O$ | 66 | 124–129 | 9.8 | 9.5 |

EXAMPLE 2

Preparation of
1-(cis-2,5-dimethylpyrrolidinyl)-thiocarboxanilide
(Compound No. 5351) by Procedure (c)

Cis-2,5-dimethylpyrrolidine (9.9 g, 0.1 m) prepared by the procedure described in Example 1 is reacted in

EXAMPLE 4

Greenhouse Herbicide Tests

Test formulations are prepared by mixing 20 ml of an acetone solution containing 0.083 g of the test compound with 20 ml of water containing 0.01 g of Triton X-155 surfactant. The resultant formulations contain 2080 ppm of test compound, 50 percent volume of acetone and 0.025 percent by weight of surfactant. Appropriate lower concentrations are obtained by diluting the stock formulation; the concentration of adjuvants are maintained at these levels.

A. Preemergence Test

Seeds of three broadleaf and three grass species are planted in soil contained in 9 inches × 9 inches × 2 inches aluminum pans filled with 1½ of composted soil. The broadleaf species are buckwheat (*Fagopyrum esculentum*), turnip (*Brassica rapa*) and zinnia (*Zinnia spp.*); the grasses are Italian millet (*Panicum ramosum*), perennial ryegrass (*Lolium perenne*) and sorghum (*Sorghum vulgare*).

The pans are then sprayed so that the soil surface is uniformly covered with 40 ml of the stock formulation to obtain a treatment rate of 16 lb/acre of the test compound or appropriate dilutions of same to obtain the lower treatment rates with the test compounds shown in Table 2. Two weeks after treatment, percent control is estimated.

Using this procedure, the results shown in Table 2 are obtained. These data show preemergence weed control (percent) obtained with broadleaves and grasses using 4, 1, and 0.25 lb/A treatments of the test compounds.

B. Postemergence Test

Aluminum pans 9 inches × 9 inches × 2 inches, as described in Example 4A, are transferred to the greenhouse where the test species are allowed to grow until one true leaf is present on the slowest growing broadleaf (zinnia). This requires 7–14 days depending on the season of the year.

The pans are then sprayed so that the soil surface and foilage are uniformly covered with 40 ml of the stock formulation (16 lb/acre) or appropriate dilutions of the same as described in Example 4A to obtain the lower treatment rates with the test compounds shown in Table 3.

Using this procedure, the results shown in Table 3 are obtained. These data show postemergence weed control (percent) obtained with broadleaves and grasses using 6, 4, 3, 1.5, 1, and 0.25 lb/A treatments of the test compounds.

TABLE 2

| | Preemergence weed control (percent) | | | | | |
|---|---|---|---|---|---|---|
| | Broadleaves (lb./a.) | | | Grasses (lb./a.) | | |
| Compound number | 4 | 1 | 0.25 | 4 | 1 | 0.25 |
| 3961 | *50 | | | *0 | | |
| 4390 | *30 | | | *0 | | |
| 4874 | 90 | 0 | | 0 | | |
| 4888 | 85 | 0 | | 0 | | |
| 17025 | **40 | | | **20 | | |
| 5307 | 10 | | | 0 | | |
| 5328 | 75 | 75 | 0 | 0 | 0 | 0 |
| 5351 | 80 | 0 | | 10 | 0 | |
| 5372 | 90 | 25 | 0 | 10 | 0 | |
| 5374 | 100 | 98 | 10 | 85 | 0 | 0 |
| 5379 | 100 | 35 | | 35 | 0 | |
| 5456 | 100 | 0 | | 0 | 0 | |
| 5457 | 70 | | | 0 | 0 | |
| 5460 | 95 | 0 | | 0 | 0 | |
| 16654 | 98 | 80 | 0 | 50 | 0 | 0 |
| 16947 | 40 | 0 | | 0 | 0 | |
| 17256 | 40 | 0 | 0 | 0 | 0 | 0 |

TABLE 2 – Continued

| | Postemergence weed control (percent) | | | | | |
|---|---|---|---|---|---|---|
| | Broadleaves (lb./a.) | | | Grasses (lb./a.) | | |
| Compound number | 4 | 1 | 0.25 | 4 | 1 | 0.25 |
| 17836 | **40 | 0 | 0 | 0 | 0 | 0 |
| 5511 | 50 | 0 | | 0 | | |
| 5512 | 90 | 0 | | 0 | | |

*Rate is 6 lb./a.
**Rate is 8 lb./a.

TABLE 3

| | Postemergence weed control (percent) | | | | | |
|---|---|---|---|---|---|---|
| | Broadleaves (lb./a.) | | | Grasses (lb./a.) | | |
| Compound number | 6 | 3 | 1.5 | 6 | 3 | 1.5 |
| 3961 | 95 | 98 | 90 | 98 | 20 | 10 |
| 4390 | 95 | 35 | 10 | 80 | 0 | 0 |
| 4391 | 98 | 90 | 20 | 75 | 0 | 0 |
| 4392 | 99 | 60 | 80 | 80 | 0 | 0 |
| 4874* | 90 | 35 | 20 | 0 | | |
| 4888* | 95 | 20 | 10 | 0 | | |
| 17025 | 80 | 25 | 10 | 10 | 0 | 0 |
| | 4 | 1 | 0.25 | 4 | 1 | 0.25 |
| 5166 | 100 | 100 | 100 | 90 | 95 | 10 |
| 5168 | 100 | 100 | 100 | 60 | 95 | 0 |
| 5171 | 100 | 100 | 100 | 65 | 85 | 5 |
| 5177 | 100 | 100 | 35 | 35 | 0 | 0 |
| 5307 | 100 | 100 | 95 | 60 | 60 | 15 |
| 5327 | 100 | 90 | | 70 | 10 | |
| 5328 | 100 | 100 | 98 | 98 | 70 | 0 |
| 5351 | 40 | 95 | | 0 | | |
| 5372 | 100 | 100 | 95 | 95 | 0 | |
| 5374 | 100 | 100 | 80 | 100 | 40 | 0 |
| 5379 | 100 | 100 | 65 | 99 | 15 | 0 |
| 5391 | 90 | 98 | 0 | 10 | 0 | |
| 5403 | 30 | | | 10 | | |
| 5456 | 100 | 99 | 85 | 65 | 30 | 0 |
| 5457 | 100 | 70 | 0 | 60 | 0 | 0 |
| 5460 | 100 | 65 | | 40 | 0 | |
| 16654 | 100 | 100 | 0 | 100 | 40 | 0 |
| 16947 | 100 | 95 | 85 | 0 | 0 | 0 |
| 17256 | 95 | 0 | 0 | 10 | 0 | 0 |
| 17836 | 100 | 0 | 0 | 0 | 0 | 0 |
| 5498 | 100 | | | 10 | | |
| 5509 | 100 | 100 | | 35 | 5 | |
| 5510 | 100 | 95 | | 15 | 0 | |
| 5511 | 100 | 40 | | 20 | 5 | |
| 5512 | 100 | 90 | | 60 | 10 | |
| 5524 | 100 | 100 | 100 | 30 | 0 | |

*Rates are 4, 2, and 1 lb./acre, respectively.

EXAMPLE 5

Field Tests

A field which has been cleared of all annual weeds before the test is sown with the following crop and weed plants: (crops) corn (*Zea mays*); (broadleaved weeds) redroot pigweed (*Amaranthus retroflexus*), prickley sida (*Sida spinosa*), wild mustard (*Brassica kaber*), velvetleaf (*Abutilon theophrasti*), purslane (*Portulaca oleracea*); (grass and sedge) crowfoot grass (*Dactyloctenium aegyptium*) and annula sedge (*Cyperus compressus*). On the day before sowing, the field is treated with aqueous suspensions prepared from 50 percent wettable powders of the various test compounds and commercial herbicide standards shown in Table 4. The herbicide test compounds and standards are incorporated by raking in two directions each at a 90° angle to one another. The active substance is applied at the rate of 4.0, 2.0, 1.0, and 0.5 pound per acre (lb/A). Eight weeks after treatment, the degree of damage to all the test plants is assessed according to a scale of values from 0 to 10; 0 denoting a completely normal plant, and 10 denoting complete destruction. The degrees of damage to the crops, broadleaved weeds, grass and sedge described above are shown in Table 4.

TABLE 4.—PREEMERGENCE HERBICIDE FIELD TESTS

| | Weed control [1] | | | | | | | | Crop injury [1] | | | |
|---|---|---|---|---|---|---|---|---|---|---|---|---|
| | Broadleaves (lb./a.) | | | | Grasses and sedge (lb./a.) | | | | Corn (lb./a.) | | | |
| Compound tested | 4.0 | 2.0 | 1.0 | 0.5 | 4.0 | 2.0 | 1.0 | 0.5 | 4.0 | 2.0 | 1.0 | 0.5 |
| 5307 | 10 | 10 | 9 | 8 | 10 | 10 | 9 | 7 | 0 | 0 | 0 | 0 |
| 5328 | 10 | 10 | 9.7 | 9.5 | 10 | 10 | 9 | 8.7 | 0 | 0 | 0 | 0 |
| 5372 | 10 | 10 | 10 | 9 | 10 | 10 | 10 | 7 | 0 | 0 | 0 | 0 |
| 5374 | 10 | 10 | 9.7 | 9.5 | 10 | 10 | 9 | 8.7 | 0 | 0 | 0 | 0 |
| 5379 | 10 | 10 | 10 | 10 | 10 | 10 | 10 | 10 | 0 | 0 | 0 | 0 |
| 5456 | 10 | 7 | 8 | 7.5 | 10 | 8 | 7 | 5 | 0 | 0 | 0 | 0 |
| 16654 | 10 | 10 | 10 | 10 | 10 | 10 | 8 | 6 | 0 | 0 | 0 | 0 |
| 17836 | 10 | 10 | 8 | 7 | 10 | 7 | 5 | 0 | 2 | 0 | 0 | 0 |
| STANDARDS: | | | | | | | | | | | | |
| Fluometuron [2] (80% WP) | 10 | 9 | 8 | 8 | 10 | 10 | 10 | 10 | 10 | 10 | 10 | 10 |
| Linuron [3] (50% WP) | 10 | 10 | 10 | 10 | 10 | 10 | 10 | 8.5 | 8 | 8 | 8 | 8 |
| Diuron [4] (80% WP) | 10 | 10 | 10 | 9.5 | 10 | 10 | 8 | 7 | 10 | 10 | 10 | 9 |

[1] Average weed control and crop injury of three replications (Pre-Plant Incorporated) using scale of 0 to 10 where 0 is a completely normal plant and 10 is complete destruction.
[2] 3-(3'-trifloromethylphenyl)-1,1-dimethylurea as 80% WP (wettable powder).
[3] 3-(3',4'-dichlorophenyl)-1-methoxy-1-methylurea as 50% WP (wettable powder).
[4] 3-(3',4'-dichlorophenyl)-1,1-dimethylurea as 80% WP (wettable powder).

What is claimed is:

1. A process of regulating plant growth which comprises applying to the locus of the plant growth a phytotoxic amount of a compound having the formula:

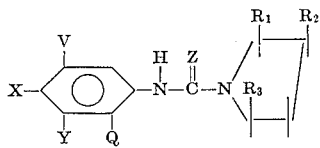

wherein $R_1$, $R_2$, and $R_3$ are selected from the group consisting of hydrogen, methyl, and combinations thereof provided at least one member is hydrogen; Z is selected from the group consisting of oxygen and sulfur; Q is selected from the group consisting of hydrogen, bromine, chlorine, fluorine, and iodine; Y, X, and V are selected from the group consisting of hydrogen, bromine, chlorine, fluorine, iodine, lower alkyl, alkoxy, halomethyl, cyano, nitro substituents and combinations thereof with the proviso that Q is not fluorine when X, Y, and V are hydrogen and with the proviso that Q and V are not fluorine when X and Y are hydrogen.

2. The process of claim 1 wherein the compound is 1-(cis-2,5-dimethylpyrrolidinyl)-carboxanilide.

3. The process of claim 1 wherein the compound is 1-(cis-2,5-dimethylpyrrolidinyl)-4'-fluorocarboxanilide.

4. The process of claim 1 wherein the compound is 1-(cis-2,4-dimethylpyrrolidinyl)-4'-fluorocarboxanilide.

5. The process of claim 1 wherein the compound is 1-(cis-2,5-dimethylpyrrolidinyl)-4'-chlorocarboxanilide.

6. The process of claim 1 wherein the compound is 1-(cis-2,5-dimethylpyrrolidinyl)-3'-trifluoromethylcarboxanilide.

7. The process of claim 1 wherein the compound is 1-(cis-2,5-dimethylpyrrolidinyl)-3'-fluorocarboxanilide.

8. The process of claim 1 wherein the compound is 1-(cis-2,5-dimethylpyrrolidinyl)-4'-iodocarboxanilide.

9. The process of claim 1 wherein the compound is used as a selective herbicide on corn.

10. The process of claim 1 wherein 1-(cis-2,5-dimethylpyrrolidinyl)-3'-fluorocaroxanilide is used as a selective herbicide on corn.

11. The process of claim 1 wherein the compound is 1-(cis-2,5-dimethylpyrrolidinyl)-3',4'-dichlorocarboxanilide.

12. The process of claim 1 wherein the compound is 1-(cis-2,5-dimethylpyrrolidinyl)-4'-cyanocarboxanilide.

13. The process of claim 1 wherein the compound is 1-(cis-2,5-dimethylpyrrolidinyl)-4'-bromocarboxanilide.

* * * * *